(12) United States Patent
Maier et al.

(10) Patent No.: US 12,304,276 B2
(45) Date of Patent: May 20, 2025

(54) SLIDABLE CENTRAL CONSOLE UNIT WITH AIR OUTLETS CONNECTED TO TELESCOPIC AIR DUCT

(71) Applicant: Daimler AG, Stuttgart (DE)

(72) Inventors: Valentin Maier, Ispringen (DE); Christoph Menzel, Stuttgart (DE); Bernd Plocher, Rottenburg (DE); Benno Stamp, Stuttgart (DE)

(73) Assignee: Daimler AG, Stuttgart (DE)

( * ) Notice: Subject to any disclaimer, the term of this patent is extended or adjusted under 35 U.S.C. 154(b) by 367 days.

(21) Appl. No.: 17/608,047

(22) PCT Filed: Apr. 15, 2020

(86) PCT No.: PCT/EP2020/060518
§ 371 (c)(1),
(2) Date: Nov. 1, 2021

(87) PCT Pub. No.: WO2020/221585
PCT Pub. Date: Nov. 5, 2020

(65) Prior Publication Data
US 2022/0227202 A1    Jul. 21, 2022

(30) Foreign Application Priority Data

May 2, 2019  (DE) .................... 10 2019 003 117.2

(51) Int. Cl.
*B60H 1/00*       (2006.01)
*B60R 7/04*       (2006.01)

(52) U.S. Cl.
CPC ..... *B60H 1/00542* (2013.01); *B60H 1/00528* (2013.01); *B60H 1/00535* (2013.01); *B60H 1/00564* (2013.01); *B60R 7/04* (2013.01)

(58) Field of Classification Search
CPC ............ B60H 1/00542; B60H 1/00528; B60H 1/00535; B60H 1/00564; B60R 2011/0007; B60R 7/04
See application file for complete search history.

(56) References Cited

U.S. PATENT DOCUMENTS 6,231,098 B1 *    5/2001   Schenk .................... B60R 7/04
                                                           224/400
10,343,488 B2    7/2019   Salter et al.
2022/0153202 A1 *  5/2022  Beyersdorfer ............ B60R 7/06

FOREIGN PATENT DOCUMENTS

DE          103 35 000 A1     2/2005
DE          103 35 999 A1     3/2005
(Continued)

OTHER PUBLICATIONS

PCT/EP2020/060518, International Search Report dated Jul. 24, 2020 (Two (2) pages).

(Continued)

*Primary Examiner* — Jorge A Pereiro
*Assistant Examiner* — Michael James Giordano
(74) *Attorney, Agent, or Firm* — Crowell & Moring LLP (57) ABSTRACT

A central console unit for a vehicle includes a first partial unit that is fixedly connectable to the vehicle and a second partial unit shiftably connected in relation to the first partial unit to the first partial unit. The first partial unit has a first air guiding arrangement that is connectable to an air-conditioning device of the vehicle. The second partial unit has a second air guiding arrangement which is shiftably connected to the first air guiding arrangement at least in sections along the first air guiding arrangement. The second partial unit forms a central console for the vehicle.

10 Claims, 3 Drawing Sheets

(56) References Cited

FOREIGN PATENT DOCUMENTS

| DE | 10 2005 017 332 B3 | | 11/2006 |
|---|---|---|---|
| DE | 10 2016 117 143 A1 | | 3/2017 |
| DE | 10 2017 200 920 A1 | | 7/2018 |
| JP | 2004210006 A | * | 7/2004 |
| JP | 2004-322789 A | | 11/2004 |
| JP | 2017-39361 A | | 2/2017 |
| KR | 20180042632 A | * | 4/2018 |

OTHER PUBLICATIONS

German-language German Office Action issued in German application No. 10 2019 003 117.2 dated Dec. 5, 2019 (Six (6) pages).
German-language Office Action issued in German Application No. 10 2019 003 117.2 dated Apr. 4, 2025 (8 pages).

* cited by examiner

SLIDABLE CENTRAL CONSOLE UNIT WITH AIR OUTLETS CONNECTED TO TELESCOPIC AIR DUCT

BACKGROUND AND SUMMARY OF THE INVENTION

The invention relates to a central console unit for a vehicle and a vehicle.

As described in DE 10 2017 200 920 A1, a motor vehicle having a central console that can be shifted in the longitudinal direction thereof is known from the prior art, comprising a stationary section fixed on the base of the motor vehicle and having at least one ventilation output and a moveable section spaced apart from the base, the section being actively connected to the stationary section in a shiftable manner.

The object of the invention is to specify an improved central console unit in comparison to the prior art for a vehicle and an improved vehicle in comparison to the prior art.

A central console unit for a vehicle comprises a first partial unit, which is or can be fixedly connected to the vehicle, and a second partial unit, which is connected to the first partial unit to be shiftable in relation to the first partial unit, in particular shiftable without steps, in particular shiftable in the longitudinal direction of the vehicle. In particular, this second partial unit of the central console unit forms a central console for the vehicle, while the first partial unit serves, in particular, for implementing a shiftably formed connection of this second partial unit formed as the central console to the vehicle. Thus, a shiftable central console, in particular one that is shiftable in the longitudinal direction of the vehicle, is implemented for the vehicle by the central console unit. The second partial unit forming this shiftable central console can thus be shifted in the direction of a rear region, i.e., a back seat region, of an interior chamber of the vehicle or in the direction of a front region, i.e., a front region, of the interior chamber of the vehicle. The first partial unit has a first ventilation arrangement that can be or is connected to an air conditioning device of the vehicle and, in particular, is arranged fixedly in the first partial unit.

According to the invention, the second partial unit has a second ventilation arrangement, which is fixedly arranged, in particular, in the second partial unit and is shiftably connected to the first ventilation arrangement at least sectionally along the first ventilation arrangement, in particular is connected in an air-tight manner or at least substantially in an air-tight manner in such a way that no air or at least substantially no air emerges outs of a connection region of the two ventilation arrangements into the outer surroundings. An airflow is thus carried out by the air conditioning device of the vehicle via the first ventilation arrangement into the second ventilation arrangement and then, expediently, via one or more air outflow openings of the second air guiding arrangement into the interior chamber, in particular passenger interior chamber, of the vehicle.

By means of the solution according to the invention, in the case of a central console arranged shiftably in the vehicle in the form of the second partial unit, an air guide through this central console, i.e., through this second partial unit, and expediently out of this into the interior chamber of the vehicle, for example for the air inflow of vehicle occupants, can be implemented. Thus, the air guide and, in particular, an outflow of the air into the interior chamber of the vehicle is adjusted to a respective position of this second partial unit forming the central console and thus optimized. In particular with an autonomously driving vehicle in which seat positions can be provided that reach far into a back seat region of the interior chamber of the vehicle, the air inflow and thus a level of thermal comfort are further ensured by the solution according to the invention.

In contrast to the solution according to the invention, air leading systems known from the prior art are rigidly installed in central consoles and are thus unsuitable for shifting. With shiftable central consoles, such air leading systems are thus installed exclusively in the non-shiftable part, for example. However, in doing so, no adjustment of the air guide and air outflow to the respective position of the central console is possible.

Advantageously, the first air guiding arrangement and the second air guiding arrangement, in particular the section of the second air guiding arrangement that can be shifted along the first air guiding arrangement, and the section of the first air guiding arrangement along which the second air guiding arrangement can be shifted form a shifting guide for shifting and advantageously also for installing the second partial unit forming the central console in relation to the first partial unit. In other words, the shifting guide is integrated with the air guide. In particular, both the air guide and the shifting guide are implemented by means of components of the first partial unit and the second partial unit. This enables a particularly compact construction of the central console unit, a small number of required components, a low weight, low costs and a low degree of installation effort of the central console unit.

The first air guiding arrangement and the second air guiding arrangement form, for example, a telescopic shifting unit, i.e., the second air guiding arrangement can be shifted telescopically with regard to the first air guiding arrangement, in particular in such a way that the second air guiding arrangement slides in or out of the air guiding arrangement in sections or the first air guiding arrangement, depending on the shifting direction, slides in or out of the second air guiding arrangement in sections.

Advantageously, the first air arrangement has at least one first air guiding pipe, which is fixedly arranged in the first partial unit, in particular, and the second air guiding arrangement has at least one second air guiding pipe, which is fixedly arranged in the second partial unit, in particular, and is shiftably connected to the first air guiding pipe at least in sections along the first air guiding pipe. In other words, the at last one first air guiding pipe and the at least one second air guiding pipe are plugged into each other in sections. The at least one first air guiding pipe and the at least one second air guiding pipe thus form the telescopic shifting unit in the form of a telescope. Here, it can be provided, for example, that the at least one second air guiding pipe, in particular with its outside, is shiftably arranged along an inside of the at least one first air guiding pipe, i.e., can be shifted into it and out of it again in sections, i.e., the at least one second air guiding pipe is sectionally arranged in at least one first air guiding pipe, or the at least one second air guiding pipe is arranged, in particular with its inside, along an outside of the at least one first air guiding pipe, i.e., displaceably on this, i.e., the at least one first air guiding pipe is arranged in sections in the at least one second air guiding pipe. Depending on the shifting of the second partial unit forming the central console, this solution enables an extension or reduction of the air guide in the shifting region between the first and second partial unit, wherein an air guide sealed to the outer surroundings is constantly ensured, such that an incorrect emergence of air is prevented and the airflow is safely led to the respective air outflow opening provided. Advantageously, the two air guiding pipes shiftably plugged into each other guide and support the second partial unit forming the central console and simultaneously form the air guide in this shifting region.

The air guiding pipes can, by way of example, each be formed from metal, for example produced by extrusion, or they can, by way of example, each be formed from plastic, in particular from one or more plastic-based materials, for example each made of one or more fibre-reinforced plastic, for example produced in a pultrusion method. A cross-section of the respective air guiding pipe can be round, for example, or have a different shape, for example oval or rectangular. Expediently, the first and second air guiding pipe have the same cross-sectional shape yet different cross-sectional dimensions in order to be able to shift them one into the other.

The second air guiding arrangement further advantageously comprises at least one air guiding channel inside the second partial unit forming the shiftable central console. This air guiding channel advantageously leads to at least one air outflow opening, through which the air can merge into the interior chamber of the vehicle. This air guiding channel is connected to the at least one second air guiding pipe.

The at least one air guiding channel or a component that comprises the at least one air guiding channel or several air guiding channels can be formed, for example, as a blow molded or injection molded part.

In a possible embodiment, the air guiding arrangement has two first air guiding pipes arranged next to each other and in parallel to each other and, expediently, spaced apart from each other which are fixedly arranged in the first partial unit, in particular, and are advantageously connected to each other, and the second air guiding arrangement has two second air guiding pipes arranged next to each other and in parallel to each other and, expediently, spaced apart from each other, which are fixedly arranged in the second partial unit, in particular, and are also advantageously connected to each other, wherein a first air guiding pipe and a second air guiding pipe are respectively allocated to each other, and wherein the respective second air guiding pipe is shiftably connected to this first air guiding pipe at least in sections along the respective air guiding pipe. In other words, the respective first air guiding pipe and the second air guiding pipe allocated to it then form such a telescopic shifting unit described above in the form of a telescopic pipe, such that, in this embodiment, two such telescopic shifting units are present each in the form of a telescopic pipe. Here, the air guiding pipes shiftably plugged in one another also advantageously guide and support the second partial unit forming the central console and simultaneously form the air guide in this shifting region. For example, the two second air guiding pipes are connected to a common air guiding channel and/or respectively connected to at least one separate air guiding channel in the second partial unit.

Thus, an increased airflow to the central console unit, through and back out of it is made possible, for example. Alternatively or additionally, a multi-zone air conditioning, for example, at least a two-zone air conditioning, can thus be implemented, since in each case a sealed air guiding chamber is formed in the second partial unit forming the central console by means of the respective first and second air guiding pipe and, expediently, by means of an air guiding channel attached to the respectively second air guiding pipe. Thus, in the central console unit there are two such air guiding chambers sealed in relation to each other. Thus, air can be guided through one of these air guiding chambers at a different temperature, for example, from air through the other air guiding chamber. Thus, when the air is flowing out of the two air guiding chambers into two different regions, i.e., into two different zones, of the interior chamber of the vehicle, a two-zone air-conditioning is implemented in the interior chamber of the vehicle.

The second partial unit is shiftably connected to the first partial unit, for example via at least one slide bearing or roller bearing. Thus, a frictionless or at least low-friction and thus attrition-free or at least low-attrition shifting of the second partial unit is made possible, in particular shifting with low force expenditure.

For example, the second partial unit is shiftably connected to the first partial unit by means of the at least one slide bearing or roller bearing via its second air guiding arrangement, in particular via its at least one second air guiding pipe or via its two second air guiding pipes. The at least one slide bearing or roller bearing is flanged to the first air guiding arrangement, in particular to the first air guiding pipe or to the two first air guiding pipes. A guide of the second air guiding arrangement, in particular of the second air guiding pipe or the two second air guiding pipes, is carried out by this slide bearing or roller bearing.

With two first air guiding pipes and two second air guiding pipes, two slide bearings or roller bearings, for example, can be provided, such that each of the second air guiding pipes is supported by a single slide bearing or roller bearing. These two slide bearings or roller bearings can be arranged, for example, in a common bearing unit.

Advantageously, the second air guiding arrangement has at least one air outflow opening, in particular at least one lateral air outflow opening and/or at least one rear air outflow opening. Thus, the air outflow into a lateral region or into both lateral regions and/or into a rear region, i.e., into a backseat region, of the interior chamber of the vehicle, for example, is made possible. For example, it can also be provided that one or more air outflow openings are arranged in a lower region of the second partial unit, i.e., of the shiftable central console, and thus in a lower region of the central console unit, and/or the first air guiding arrangement has one or more air outflow openings, which are thus also arranged in the lower region of the central console unit. These air outflow openings can then be used, for example, for substituting conventional base airstones, which are usually arranged below vehicle seats of the vehicle, i.e., such classic base airstones are then no longer necessary, whereby construction space, installation time, material, costs and weight can be saved.

The central console unit advantageously comprises at least one drive unit, in particular at least one electrical drive unit, in particular at least one electromotive drive unit, for shifting the second partial unit, in particular for shifting it in the longitudinal direction of the vehicle. The at least one drive unit comprises, for example, an electric engine and a coupling bar, wherein the electric engine is fixed to the first partial unit, and the coupling bar is coupled to the electric engine and the second partial unit. Thus, the second partial unit forming the central console can be shifted in the same direction as the coupling bar by means of a longitudinal movement of the coupling bar. In this way, a comfortable shifting of the second partial unit forming the central console into a respectively desired position is made possible. Alternatively, a different drive unit would also be possible, for example, or a manual shifting of the second partial unit, for example, could also be provided.

For example, an illumination arrangement can be provided on the central console unit, in particular on the second partial unit, in particular an ambient illumination arrangement. Thus, an illumination of the interior chamber of the vehicle can be optimized and adjusted, in particular, to a respective position of the second partial unit forming the central console. In addition, a hovering impression of the second partial unit forming the shiftable central console, for example, in particular of a rear region of this second partial unit, in particular in a backwardly shifted state, can thus be highlighted.

By way of example, a base step can be provided on an underside of the second partial unit, in particular on the rear region thereof, and/or on an interior chamber base of the interior chamber of the vehicle, in order to enable a mechanical support, in particular against a mechanical load, of the second partial unit in the extended, in particular completely extended state, i.e., in the backwardly shifted state. With an arrangement of this base step on the interior chamber floor, this base step is positioned in such a way that the second partial unit abuts on this in the backwardly, in particular completely backwardly, shifted state. Expediently, it glides backwardly on this base step by means of increasing shifting.

A vehicle according to the invention comprises such a central console unit, wherein the first partial unit is expediently fixedly connected to the vehicle, and the first air guiding arrangement is expediently connected to the air-conditioning device of the vehicle. The advantages described above are the result of this.

Exemplary embodiments of the invention are explained in more detail below by means of the drawings.

DETAILED DESCRIPTION OF THE DRAWINGS

Parts corresponding to on another are provided with the same reference numerals in all figures.

Figure 1:
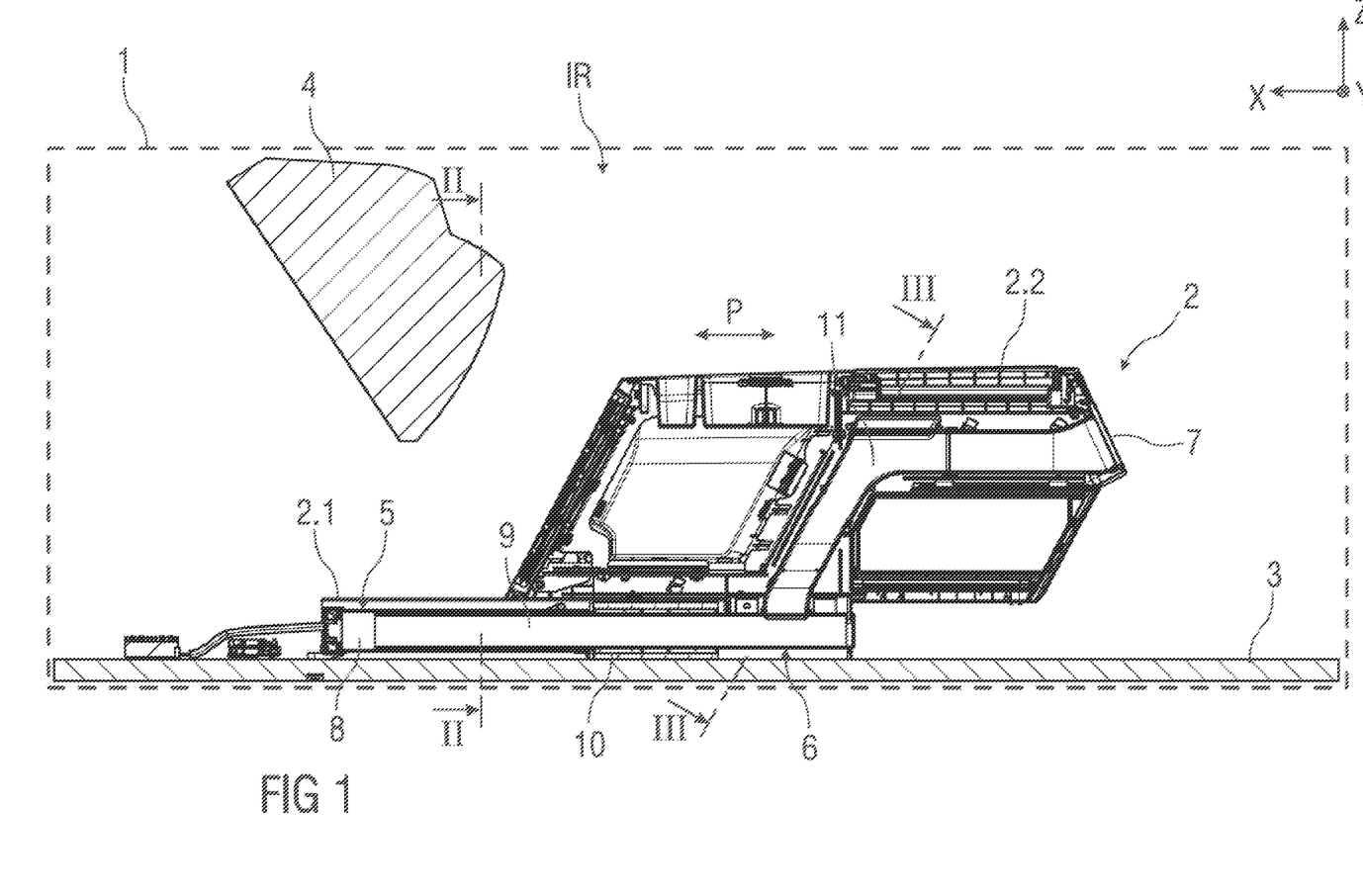
FIG. 1, schematically, is a longitudinal sectional depiction of a vehicle having a central console unit.
Figure 2:
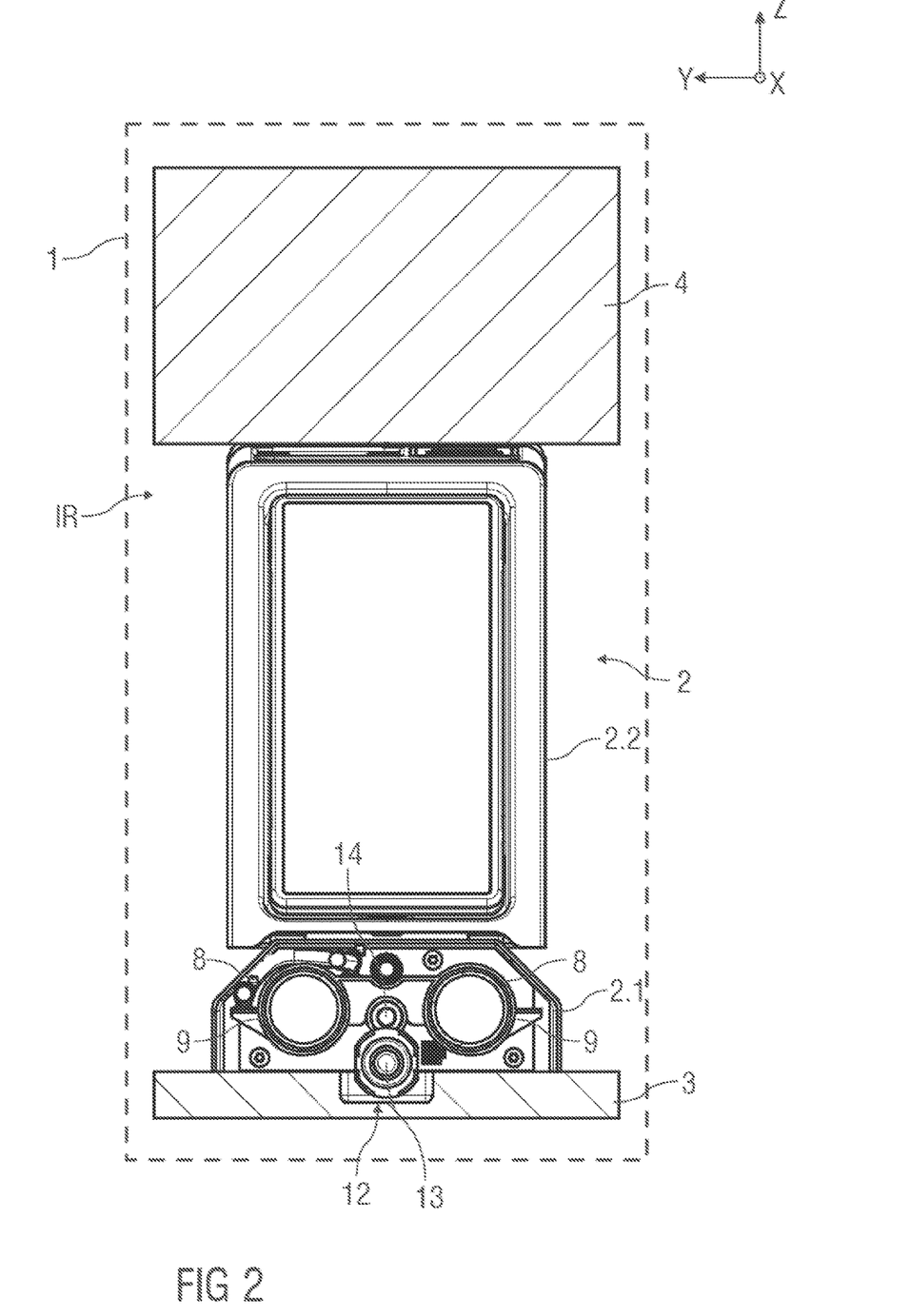
FIG. 2, schematically, is a sectional depiction corresponding to the sectional plane II-II in FIG. 1.
Figure 3:
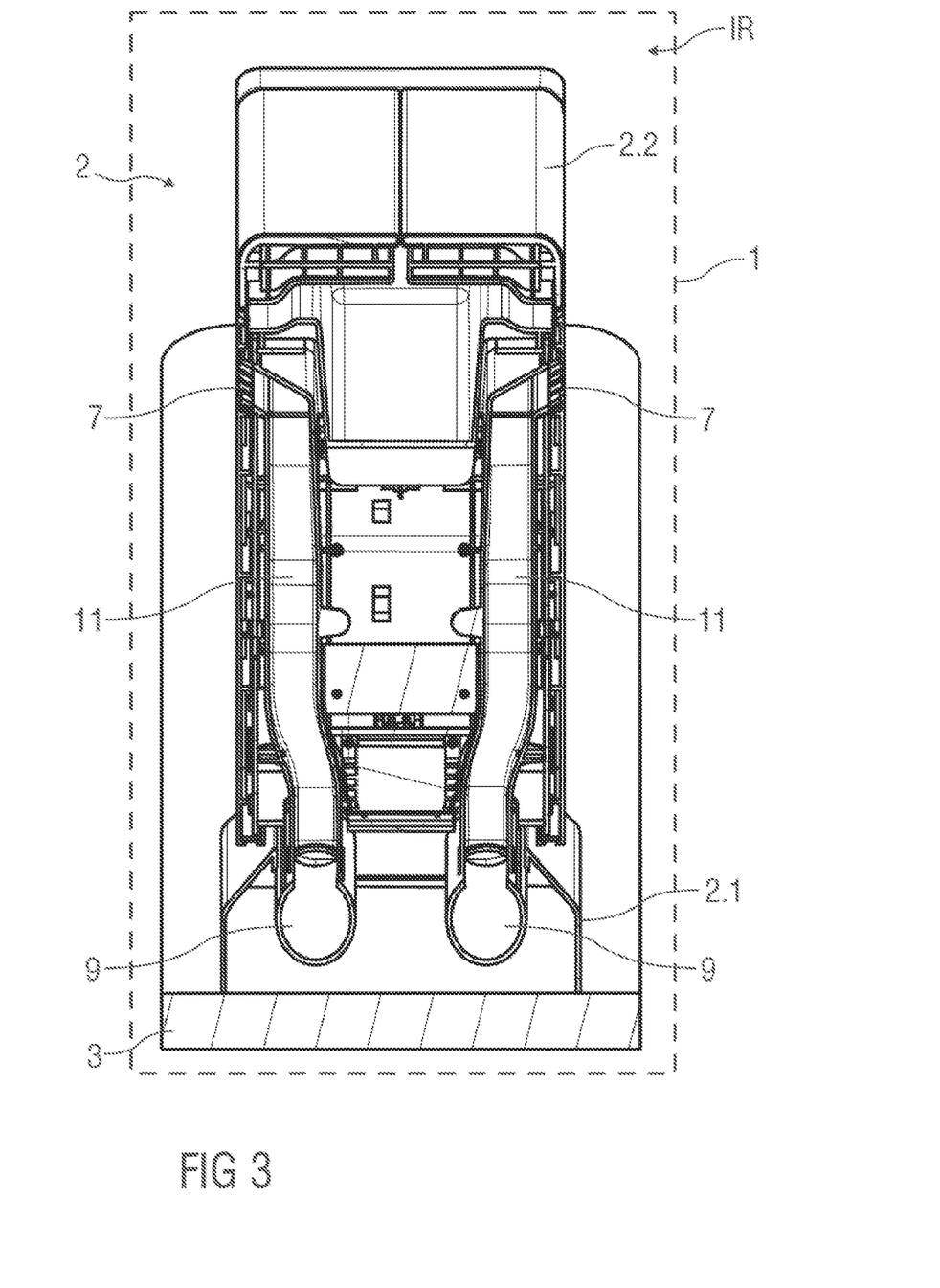
FIG. 3, schematically, is a sectional depiction corresponding to the sectional plane III-III in FIG. 1.

FIGS. 1 to 3 show schematic sectional depictions of a vehicle 1 having a central console unit 2, wherein the vehicle 1 is depicted here in a greatly simplified manner. In particular, only one interior chamber floor 3, the central console unit 2 fixed thereto and an instrument panel 4 of the vehicle 1 are substantially depicted of an interior chamber IR of the vehicle. FIG. 1 shows a longitudinal sectional depiction, i.e., a sectional depiction along a longitudinal axis of the vehicle 1. This longitudinal axis runs in the X direction X of a three-dimensional coordinate system. A transverse axis of the vehicle 1 runs in the Y direction Y and a vertical axis in the Z direction Z of this three-dimensional coordinate system.

FIG. 2 shows a sectional depiction corresponding to the sectional plane II-II in FIG. 1.

FIG. 3 shows a sectional depiction corresponding to the sectional plane III-III in FIG. 1.

The central console unit 2 comprises a first partial unit 2.1, which is fixedly connected, for example fixedly screwed, adhered and/or welded, to the vehicle 1, in particular to a shell construction of the vehicle 1, in particular to the interior chamber floor 3. Furthermore, the central console unit 2 comprises a second partial unit 2.2, which is shiftably connected to the first partial unit 2.1 in relation to the first partial unit 2.1, in particular shiftably without steps, in particular shiftably in the longitudinal direction of the vehicle 1, i.e., in parallel to its longitudinal axis and thus shiftably in the X direction X and vice versa, i.e., shiftably backward and forward in the interior chamber IR of the vehicle 1, as shown in FIG. 1 by means of a shifting arrow P.

In particular, this second partial unit 2.2 of the central console unit 2 forms a central console of the vehicle 1, while the first partial unit 2.1 serves, in particular, to implement a shiftably formed connection of this second partial unit 2.2, formed as the central console, to the vehicle 1. Thus, by means of the central console unit 2, a shiftable central console of the vehicle 1, in particular shiftable in the longitudinal direction of the vehicle 1, is achieved. The second partial unit 2.2 forming this shiftably central console can thus be shifted in the direction of a rear region, i.e., a backseat region, of the interior chamber IR of the vehicle 1 or in the direction of an anterior region, i.e., a front region, of the interior chamber IR of the vehicle 1.

The non-shiftable first partial unit 2.1 has a first non-shiftable air guiding arrangement 5 connected to an air-conditioning device, not depicted here, of the vehicle 1. This first partial unit 2.1, in particular its first air guiding arrangement 5, thus constitutes the interface for the air-conditioning device of the vehicle 1.

The second partial unit 2.2 has a second air guiding arrangement 6, which is shiftably connected to the first air guiding arrangement 5 at least sectionally along the first air guiding arrangement 5. An airflow is thus carried out from the air-conditioning device of the vehicle 1 via the first air guiding arrangement 5 into the second air guiding arrangement 6, and then expediently via one or more air outflow openings 7 of the second air guiding arrangement 6 into the interior chamber IR, in particular passenger interior chamber, of the vehicle 1.

Advantageously, the first air guiding arrangement 5 and the second air guiding arrangement 6, in particular the section of the second air guiding arrangement 6 that can be shifted along the first air guiding arrangement 5, and the section of the first air guiding arrangement 5, along which the second air guiding arrangement 6 can be shifted, form a shifting guide for shifting and, advantageously, also for supporting the second partial unit 2.2 forming the central console in relation to the first partial unit 2.1. In other words, the shifting guide is integrated with the air guide. In particular, both the air guide and the shifting guide are achieved by means of components of the first partial unit 2.1 and the second partial unit 2.2.

As can be seen in FIG. 1, the first air guiding arrangement 5 and the second air guiding arrangement 6 form a telescopic shifting unit, i.e., the second air guiding arrangement 6 can be shifted in a telescopic manner, in particular in the manner of a telescope, in relation to the first air guiding arrangement 5, in particular in such a way that the second air guiding arrangement 6, depending on the shifting direction, slides into or out of the first air guiding arrangement 5 in sections, as shown in the depicted example, or the first air guiding arrangement 5, depending on the shifting direction, slides into or out of the second air guiding arrangement 6.

The first air guiding arrangement 5 has at least one first air guiding pipe 8 which is arranged fixedly in the first partial unit 2.1, and the second air guiding arrangement 6 has at least one second air guiding pipe 9 which is fixedly arranged in the second partial unit 2.2 and is shiftably connected to the first air guiding pipe 8 at least in sections along the first air guiding pipe 8, as shown in FIGS. 1 and 2. The at least one first air guiding pipe 8 and the at least one second air guiding pipe 9 thus form the telescopic shifting unit in the form of a telescope. Here, it can be provided, for example, that the at least one second air guiding pipe 9 is shiftably arranged with its outside along an inside of the at least one first air guiding pipe 8, as in the depicted example, depicted in FIG. 1 or 2, or is shiftably arranged with its inside along an outside of the at least one first air guiding pipe 8, i.e., the second air guiding pipe 9 is arranged sectionally in the first air guiding pipe 8 and shiftably in and out, as depicted here, or the first air guiding pipe 9 is arranged sectionally in the second air guiding pipe 8, and the second air guiding pipe 9 can be shifted onto and shifted off of the first air guiding pipe 8. Advantageously, the two air guiding pipes 8, 9 that are shiftably plugged into each other guide and support the second partial unit 2.2 forming the central console and simultaneously form the air guide in this shifting region.

In the example depicted, the first air guiding arrangement 5 has two such first air guiding pipes 8 arranged one next to the other and in parallel to each other and spaced apart from each other, the air guiding pipes being fixedly arranged in the first partial unit 2.1 and being connected to each other, as shown in FIG. 2, and thus forming a first pipe system, and the second air guiding arrangement 6 has two second air guiding pipes 9 arranged one next to the other and in parallel to each other and spaced apart from each other, the air guiding pipes being fixedly arranged in the second partial unit 2.2 and advantageously also being connected to each other, as shown in FIG. 3, and thus forming a second pipe system. Here, a first air guiding pipe 8 and a second air guiding pipe 9 are respectively allocated to each other, and the respective first air guiding pipe 9 is shiftably connected to this first air guiding pipe 8 at least in sections along the respective first air guiding pipe 8. In other words, the respective first air guiding pipe 8 and the second air guiding pipe 9 allocated to it then form such a telescopic shifting unit, described above, in the form of a telescope, such that, in this embodiment, two such telescopic shifting units are present in the form of a telescope in each case. Here too the air guiding pipes 8, 9 that are shiftably plugged into each other advantageously guide and support the second partial unit 2.2 forming the central console and simultaneously form the air guide in this shifting region. The connection of the second partial unit 2.2 forming the shiftable central console to the first partial unit 2.1 connected to the vehicle 1 is thus carried out via the shiftable connection of the second pipe system fixed on the central console, comprising the two second air guiding pipes 9, to the first pipe system, comprising the two first air guiding pipes 8.

The air guiding pipes 8, 9 can, by way of example, each be formed from metal, for example produced by extrusion moulding, or they can, by way of example, each be formed from plastic, in particular from one or more plastic-based materials, for example each from one or more fibre-reinforced plastics, for example produced in a pultrusion method. A cross-section of the respective air guiding pipe 8, 9 can be round, for example, or have a different shape, for example oval or polygonal. The respective first air guiding pipe 8 and the second air guiding pipe 9 allocated to it here have the same cross-sectional shape, yet different cross-sectional dimensions, in order to be able to be shift them into each other. In the example depicted, the second air guiding pipes 9 and the first air guiding pipes 8 each have a round cross-section, wherein the second air guiding pipes 9 each have a smaller diameter than the respective first air guiding pipe 8, in order to insert the respective second air guiding pipe 9 into the respective first air guiding pipe 8 and to be able to shift increasingly into it and regionally back out of it again. The second pipe system can advantageously move without friction or at least with low friction in relation to the first pipe system, whereby the longitudinal shifting of the second partial unit 2.2 forming the central console is achieved.

Thus, the first partial unit 2.1 that is fixedly screwed, adhered and/or welded on the shell construction of the vehicle 1, in particular on the interior chamber floor 3, and is thus not shiftable, guides and supports the second partial unit 2.2 forming the shiftable central console using its first air guiding arrangement 5, in particular with its two first air guiding pipes 8, and constitutes the interface for the air-conditioning device.

In the example depicted, the second partial unit 2.2 is shiftably connected to the first partial unit 2.1 via at least one slide bearing or roller bearing 10. The slide bearing or roller bearing 10 is, for example, flanged on the first air guiding arrangement 5, in particular on the two first air guiding pipes 8, i.e., on the first pipe system, as shown in FIG. 1. A guide of the second air guiding arrangement 6, in particular of the two second air guiding pipes 9, i.e., of the second pipe system, is carried out by its slide bearing or roller bearing 10.

The second air guiding arrangement furthermore comprises at least one air guiding channel 11 inside the second partial unit 2.2 forming the shiftable central console, the channel leading to at least one air outflow opening 7, through which the air can emerge into the interior chamber IR of the vehicle 1. This air guiding channel 11 is connected to the at least one second air guiding pipe 9 or to the two second air guiding pipes 9. In the example depicted here, the second air guiding arrangement 6 comprises two such air guiding channels 11, which are each connected to one of the second air guiding pipes 9 and each lead to at least one air outflow opening 7. In the example depicted here, the respective air guiding channel 11 leads respectively to a lateral air outflow opening 7 of the second partial unit 2.2 forming the shiftable central console, as shown in FIG. 3, in particular, and respectively to a rear air outflow opening 7 of the second partial unit 2.2 forming the shiftable central console, as shown in FIG. 1, in particular. The lateral air outflow openings 7 are provided for air outflow in the direction of a driver and front seat passenger and the rear air outflow openings 7 for air outflow into the back seat region of the interior chamber IR of the vehicle 1 and thus to back seat passengers.

The respective air guiding channel 11 or a component comprising the two or more air guiding channels 11 can be formed, for example, as a blow mould or injection mould part.

Alternatively or additionally to the arrangement shown and described here of the air outflow openings 7, it can also be provided, for example, that one or more air outflow openings 7 are arranged in a lower region of the second partial unit 2.2, i.e., of the shiftable central console, and thus in a lower region of the central console unit 2 and/or that the first air guiding arrangement 5 of the first partial unit 2.1 has one or more air outflow openings 7, which are thus also arranged in the lower region of the central console unit 2. These air outflow openings 7 can then be used, for example, for substituting conventional floor airstones, which are usually arranged bellow vehicle seats of the vehicle 1.

With the solution described here of the central console unit 2 with a shiftable central console, a basic function of the shifting of the second partial unit 2.2 forming the shiftable central console and the relative movement of the two partial units 2.1, 2.2 associated with this and thus the two pipe systems is added to the function of the air guide inside this shiftable central console in compact construction.

In the example depicted, the central console unit 2 comprises a drive unit 12 for shifting the second partial unit 2.2 forming the shiftable central console in the longitudinal direction of the vehicle 1, which is formed as an electric drive unit 12, in particular as an electromotive drive unit 12. This drive unit 12, which is here arranged between the air guiding pipes 8, 9 arranged one next to the other and thus enables a compact construction of the central console unit 2, comprises, in the example depicted, an electric engine 13 and a coupling rod 14, wherein the electric engine 13 is fixed on the first partial unit 2.1, and the coupling rod 14, which is guided through a bearing unit comprising the slide bearing or roller bearing 10 in the depicted example, is coupled to the electric engine 13 and the second partial unit 2.2, in particular with a receiver for the second pipe system. Thus, the second partial unit 2.2 forming the central console can be shifted by a longitudinal movement of the coupling rod 14 in the same direction.

A support of the second partial unit 2.2, for example via a floor step, can be provided for the mechanical relief of the second partial unit 2.2 forming the central console, in particular in the extended, i.e., backwardly shifted, state and with simultaneous loading in the rear region.

For example, an illumination arrangement can be provided on the central console unit 2, in particular on the second partial unit 2.2, in particular an ambient illumination arrangement. Thus, an illumination of the interior chamber IR of the vehicle 1 can be optimized and adjusted, in particular, to a respective position of the second partial unit 2.2 forming the central console. In addition, a floating impression of the second partial unit 2.2 forming the shiftable central console 2.2, in particular or a rear region of this second partial unit 2.2, for example, in particular in a backwardly shifted state, can thus be highlighted.

The invention claimed is:

1. A central console unit (2) of a vehicle (1), comprising:
   a first partial unit (2.1) that is fixedly connectable to the vehicle (1); and
   a second partial unit (2.2) shiftably connected in relation to the first partial unit (2.1) to the first partial unit (2.1);
   wherein the first partial unit (2.1) has a first air guiding arrangement (5) that is connectable to an air-conditioning device of the vehicle (1);
   wherein the second partial unit (2.2) has a second air guiding arrangement (6) which is shiftably connected to the first air guiding arrangement (5) along the first air guiding arrangement (5) to form an air guide through the second partial unit (2.2);
   wherein the second partial unit (2.2) forms a central console of the vehicle (1);
   wherein a section of the second air guiding arrangement (6) that is shiftable along the first air guiding arrangement (5) and a section of the first air guiding arrangement (5) along which the second air guiding arrangement (6) is shiftable form a shifting guide for shifting the second partial unit (2.2) in relation to the first partial unit (2.1) and also for supporting the second partial unit (2.2) forming the central console in relation to the first partial unit (2.1);
   wherein the shifting guide is integrated with the air guide such that both the air guide and the shifting guide are implemented by the section of the second air guiding arrangement (6) that is shiftable along the first air guiding arrangement (5) and the section of the first air guiding arrangement (5) along which the second air guiding arrangement (6) is shiftable;
   wherein the first air guiding arrangement (5) has a first air guiding pipe (8), wherein the second air guiding arrangement (6) has a second air guiding pipe (9) which is shiftably connected to the first air guiding pipe (8) along the first air guiding pipe (8), wherein the second air guiding pipe (9) is shiftable along the first air guiding pipe (8) in a direction toward a front of the vehicle (1) beyond a front-most end of the second partial unit (2.2) that forms the central console of the vehicle (1) and beyond a rear-most end of an instrument panel (4) of the vehicle (1), wherein the first air guiding pipe (8) of the first air guiding arrangement (5) and the second air guiding pipe (9) of the second air guiding arrangement (6) are disposed below a portion of the second partial unit (2.2) that forms the central console such that the first air guiding pipe (8) and the second air guiding pipe (9) support the portion of the second partial unit (2.2) that forms the central console and form the shifting guide and the air guide, and wherein an air guiding channel (11) is connected to the second air guiding pipe (9) and extends from below the portion of the second partial unit (2.2) that forms the central console up through the portion of the second partial unit (2.2) that forms the central console.

2. The central console unit (2) according to claim 1, wherein the second air guiding pipe (9) is shiftable along an inside or along an outside of the first air guiding pipe (8).

3. The central console unit (2) according to claim 1, wherein the first air guiding arrangement (5) has two first air guiding pipes (8) disposed one next to the other and in parallel to each other forming a first pipe system, wherein the second air guiding arrangement (6) has two second air guiding pipes (9) disposed one next to the other and in parallel to each other forming a second pipe system, and wherein the first pipe system and the second pipe system form the shifting guide and the air guide.

4. The central console unit (2) according to claim 1, wherein a slide bearing or a roller bearing (10) is flanged on the first air guiding arrangement (5) and wherein the second partial unit (2.2) is shiftably connected to the first partial unit (2.1) via the slide bearing or the roller bearing (10) flanged on the first air guiding arrangement (5).

5. The central console unit (2) according to claim 1, wherein a slide bearing or a roller bearing (10) is flanged on the first air guiding pipe (8) and wherein the second air guiding pipe (9) shiftably moves on the first air guiding pipe (8) via the slide bearing or the roller bearing (10) flanged on the first air guiding pipe (8).

6. The central console unit (2) according to claim 1, wherein the second air guiding arrangement (6) has an air outflow opening (7).

7. The central console unit (2) according to claim 6, wherein the air outflow opening (7) is a lateral air outflow opening or a rear air outflow opening (7).

8. The central console unit (2) according to claim 1, further comprising a drive unit (12) for shifting the second partial unit (2.2).

9. The central console unit (2) according to claim 8, wherein the drive unit (12) comprises an electric engine (13) and a coupling rod (14), wherein the electric engine (13) is fixed to the first partial unit (2.1), and wherein the coupling rod (14) is coupled to the electric engine (13) and the second partial unit (2.2).

10. A vehicle (1), comprising:
    an air-conditioning device; and the central console unit (2) according to claim 1, wherein the first partial unit (2.1) is fixedly connected to the vehicle (1) and wherein the first air guiding arrangement (5) is connected to the air-conditioning device.

* * * * *